May 10, 1955
C. E. POYER
2,708,062
BOTTLE HOLDER FOR AUTOMOBILES
Filed Oct. 10, 1952
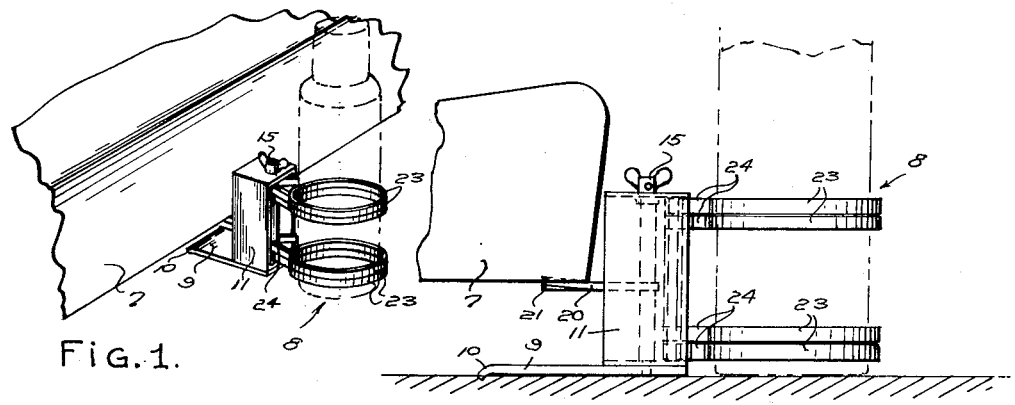
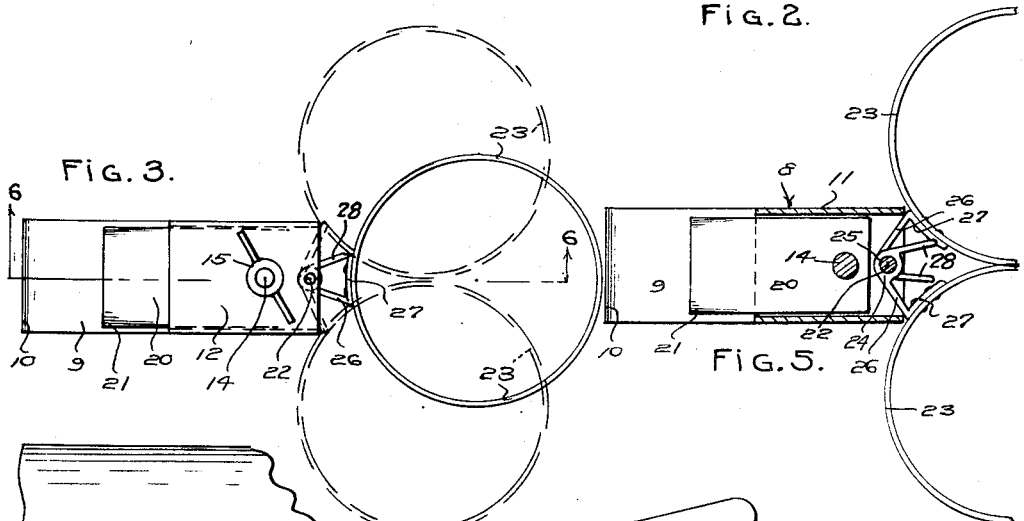
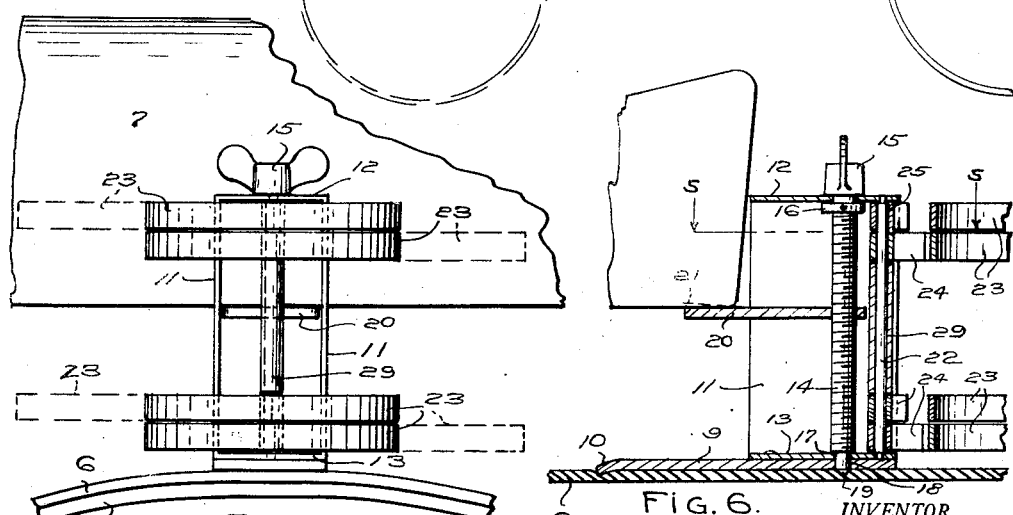
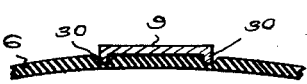
INVENTOR.
CHARLES E. POYER,
BY
ATTORNEY.

United States Patent Office 2,708,062
Patented May 10, 1955

2,708,062

BOTTLE HOLDER FOR AUTOMOBILES

Charles E. Poyer, Miami Beach, Fla., assignor of one-half to Mary O. Poyer, Miami Beach, Fla.

Application October 10, 1952, Serial No. 314,018

5 Claims. (Cl. 224—29)

This invention relates to devices for use with automobiles and has particular reference to a detachable bracket for supporting one or more bottles or the like in a vertical position against falling, rolling or otherwise being displaced.

Many persons taking long automobile trips, prefer to carry the well known vacuum bottles for refreshment purposes and heretofore, these bottles have proven a source of annoyance due to their rolling about the floor of the vehicle and, as so frequently happens, when the door of the vehicle is opened, the bottle rolls therefrom and falls upon the ground, in most instance becoming broken.

The device of the present invention has been provided to be rigidly mounted in a clamping position substantially intermediate the length of the front seat of the vehicle with the clamping being between the bottom of the seat and the floor of the vehicle, with the device being adjustable to accommodate itself to various clearances between the seat and the floor of practically all well known vehicles.

A novel feature of the invention resides in the fact that the device requires no special or separate attaching means and requires but a minute to mount in operative position.

A further novel feature resides in the novel support for the vacuum bottle that positions the bottle in a handy position between the driver of the vehicle and the passenger, with the bottle support being so constructed as to be adjusted for the upright support of two bottles, if desired.

Novel features of construction and operation will be more readily understood from a reference to the accompanying drawings, coupled with the following specification, in which is shown and described a preferred embodiment of the device and wherein like characters of reference are employed to denote like parts throughout.

Referring to the drawings:

Figure 1 is a perspective view of a bottle support mounted in clamping position at the front of a vehicle seat, Figure 2 is a side elevation thereof on an enlarged scale, Figure 3 is a top plan view of the device, Figure 4 is a front elevation of the device, Figure 5 is a horizontal section taken on line 5—5 of Figure 6, Figure 6 is a vertical longitudinal section taken on line 6—6 of Figure 3 and, Figure 7 is a fragmentary transverse section through a modified form of base plate for the device.

Referring specifically to the drawings, the numeral 5 designates the floor of the vehicle substantially centrally of the vehicle, usually covered by a carpet or rubber matting or rug 6. A conventional front seat 7 of any well known construction has been fragmentarily shown and the bottom of the seat is normally spaced above the floor and rug 5 and 6 and, it should be here pointed out, that the space between the bottom of the seat 7 and the rug 6 varies greatly in different makes of vehicles and, since the device of this invention is adapted to be rigidly mounted in clamping position within this space, it therefore follows that means must be provided to readily and easily accommodate the device to the various spacings.

The device of the present invention, is indicated as a whole by the reference character 8 and embodies a base plate 9, generally rectangular in top plan and preferably having its rear end slightly curved downwardly, as at 10. Rigidly supported upon the base plate 9 at its forward portion, is an upright rectangular frame 11, open at front and rear. The frame 11 is preferably riveted to the plate 9 to be rigid therewith. The top and bottom walls 12 and 13 of the frame 11 are apertured for the rotative reception of an adjusting screw 14. The upper end of the screw 14 projects above the top wall 12 and has fixed thereto a winged operating head 15. A collar 16 is fixed to the screw 14 below the wall 12 to prevent the axial shifting of the screw. The lower terminal end of the screw 14 is preferably reduced in diameter and this reduced end 17 passes through the aperture of the wall 13 and a concentric aperture 18 of the plate 9, with the end being pointed at 19, for a purpose to be presently described. Threaded upon the screw 14, is a vertically shiftable clamping plate 20, being flat over its major area and of a width to freely shift in a vertical plane under the influence of the screw 14, without twisting laterally. The plate 20 projects rearwardly of the frame 11 and has its rear corners slightly turned upward, as at 21, for a purpose to be presently described.

Fixed within the frame 11, forwardly of and parallel with the screw 14, is a shaft 22, the upper and lower ends of which are preferably anchored in the walls 12 and 13. Swingably supported upon the shaft 22, are a plurality of rings 23, of identical diameter. The rings are here shown as being four in number and arranged in closely positioned upper and lower pairs. The rings are normally concentric when but a single bottle is to be supported. The rings are swingably supported upon the shaft 22 by brackets 24, of generally V-shape, having an apertured head 25 of a diameter to receive the shaft 22. One arm 26 of each bracket is shaped to engage the side of a ring, where it is preferably riveted or welded, as at 27. The opposite arm 28 of each bracket 24 serves as a stop to limit the swinging movement of the rings to the position where they are accurately concentrically arranged. It is contemplated that the upper ring of each pair shall swing in the same direction to the dotted line position shown in Figure 4, while the bottom ring of each pair swing in the same direction but opposite to that of the first pair of rings, with the several rings when swung to the dotted line positions being concentric as to each pair. The arms 26 of each bracket serve to limit the outer swinging of the several rings by abutting the sides of the frame 11. Obviously, the purpose of being able to swing the pairs of rings 23 outwardly, is to provide a double socket for the reception of two vacuum bottles. A spacing sleeve 29 serves to maintain the upper and lower pairs of rings properly positioned with respect to each other.

In the modified form of the invention illustrated in Figure 7, the base plate 9 has been shown as being of channel form, with its two marginal flanges 30 downwardly directed.

In the use of the device, the screw 14 is rotated to cause the plate 20 to shift downwardly to a position above the base 9 where the base 9 and plate 20 can be inserted beneath the seat of the vehicle and usually over that area of the floor that is elevated in the modern vehicle. The device is then shifted rearwardly to a position where the frame 11 is slightly spaced from the front wall of the seat, with the base 9 flatly engaging the rug or carpet 6. The screw 14 is then rotated in the opposite direction to cause the plate 20 to travel upwardly and grip the underneath part of the seat of the vehicle. Continued rotation of the screw 14 causes the upturned corners 21 of the plate 20 to bite into the structure of the seat, while the downturned rear end of the base 10 and the pointed end of the screw 19 bite into the rubber or carpet rug 9, which actions successfully prevent the lateral shifting of the device in use or while being adjusted. The screw is rotated until it is determined that the device is securely anchored. The several rings in the forwardly extending concentric position of Figures 1, 2, 3 and 4, jointly provide a relatively deep socket into which a conventional vacuum bottle can be placed and maintained in a vertical position against displacement. When it is desired to support two bottles, the two pairs of rings are shifted outwardly to the dotted line position of Figures 3 and 4 and the full line position of Figure 5, with the rings being automatically concentrically aligned by the stop arms of the brackets 24. Thus, two identical sockets are provided that have a depth sufficient to receive and maintain the vacuum bottles against tilting or otherwise shifting from the upstanding position. The two sockets thus provide means of support for bottles carrying hot and cold beverages and with the bottles conveniently arranged and easily accessible to either the driver of the vehicle or the adjacent passenger. The channel form of the base 9, illustrated in Figure 7 will increase the gripping action of the base with respect to the rug and prevent lateral twisting of the base and the supported frame. The entire device may be constructed of any suitable material, such as metal or plastic and the rings 23 may be coated with any suitable material calculated to prevent scratching or otherwise marring the bottles. While the device has been constructed to support either one or two bottles, it will be apparent that a third pair of rings may be employed and the several structural details altered to support the swinging movement for forming three sockets.

It will be apparent from the foregoing, that a highly convenient means has been provided to support one or more vacuum bottles or the like in a vertical or upright position against tilting or rolling. The parts are few and simple and can be manufactured at a relatively low cost and the device readily adapts itself to the various vehicles, being adjustable over a relatively wide range. The device is easily and quickly installed and offers no objectionable interference with the proper operation of the vehicle or the comfort and leg room of the driver and passenger.

It is to be understood, that the invention is not limited to the precise arrangement shown, but that various changes in the structure are contemplated as fall within the spirit of the invention or the scope of the subjoined claims.

Having described my invention, what I claim as new and desire to secure by Letters Patent is:

1. A bottle support for use with the seat and adjacent floor area of a motor vehicle to maintain a bottle in a perpendicular position, the support comprising a flat base plate that extends beneath the front portion of the seat, the base plate having normal flat contact with a rug normally employed to cover the floor area, an upstanding open frame rigidly connected to the base plate outwardly of the front of the seat, a vertically disposed screw device journalled in the frame, means at one end of the screw for the manual rotation thereof, means at the lower end of the screw that projects through an opening formed in the frame and the base and that projects below the underside of the base plate for biting engagement with the rug, a clamping plate shiftably positioned in the frame and having one end projecting rearwardly of the frame to overlie and parallel the base plate, the clamping plate having threaded engagement with the screw device to be shiftable in a vertical plane when the screw is rotated, the clamping plate extending beneath the bottom of the seat, gripping means formed on the clamping plate to bite into the underside of the seat when the plate is shifted to clamping position, a plurality of identical rings positioned forwardly of the frame to normally lie in concentric relation to form a socket for the perpendicular support of a bottle, the rings being arranged in upper and lower pairs, bracket devices carried by each ring, pivotal means carried by the frame for the swinging support of the bracket devices, the rings being shiftable laterally in a horizontal plane through the medium of the brackets and the pivotal means, the rings being shiftable in upper and lower pairs to form identical spaced apart sockets for the support of two bottles and means formed on the brackets to limit the swinging movement of the rings so that they are all concentric when in a single socket forming position and so that each pair when swung outwardly are concentric.

2. The device as recited in claim 1, wherein the end of the base plate that extends beneath the seat is turned downwardly to bite into the floor covering rug, the projecting end of the screw device being pointed to bite into the rug when the device is adjusted to fully clamped position to prevent lateral shifting of the bottle holder in use.

3. The device as in claim 1, wherein that portion of the clamping plate that extends beneath the seat has its free corners upturned to bite into the underside of the seat when the device is fully clamped into operative position.

4. The device as in claim 1, wherein the base plate is provided with depending longitudinally extending flanges that bite into the rug when the holder is in fully clamped position.

5. The device as in claim 1, wherein the rings are arranged in upper and lower pairs and means for maintaining the rings in spaced apart relationship throughout their shifting movement to form a single or a multiple bottle holder.

References Cited in the file of this patent
UNITED STATES PATENTS

| | | |
|---|---|---|
| 169,962 | Cross | Nov. 16, 1875 |
| 599,409 | Walker | Feb. 22, 1898 |
| 719,268 | Slyder | Jan. 27, 1903 |
| 1,592,643 | O'Leary | July 13, 1926 |
| 2,248,513 | Riley | July 8, 1941 |
| 2,516,271 | Taylor | July 25, 1950 |